United States Patent
Welke

[11] Patent Number: 5,833,022
[45] Date of Patent: Nov. 10, 1998

[54] HYBRID DRIVE

[75] Inventor: Knut Welke, Dittelbrunn, Germany

[73] Assignee: Fichtel & Sachs AG, Schweinfurt, Germany

[21] Appl. No.: 895,839

[22] Filed: Jul. 17, 1997

[30] Foreign Application Priority Data

Jul. 20, 1996 [DE] Germany ............... 196 29 346.4

[51] Int. Cl.$^6$ .................................................. B60K 1/00
[52] U.S. Cl. .............. 180/65.2; 180/65.4; 180/65.7; 192/113.4; 477/5
[58] Field of Search ................ 180/65.2, 65.4, 180/65.7, 65.1, 65.3, 65.5; 123/41.14, 195 C, 198 E; 310/67 R, 88, 51, 100, 78, 85, 89; 192/113.4; 477/5

[56] References Cited

U.S. PATENT DOCUMENTS

| | | | |
|---|---|---|---|
| 2,002,943 | 5/1935 | Hartley | 192/113.4 |
| 4,570,741 | 2/1986 | McCoy | 180/65.5 |
| 5,491,370 | 2/1996 | Schneider et al. | 310/89 |

FOREIGN PATENT DOCUMENTS

| | | | |
|---|---|---|---|
| 2419987 | 10/1975 | Germany | 180/65.7 |
| 3150611 | 6/1983 | Germany | 180/65.2 |
| 39 14 426 | 8/1990 | Germany . | |
| 43 23 601 | 1/1995 | Germany . | |
| 44 14 684 | 11/1995 | Germany . | |
| 3-42333(A) | 2/1991 | Japan | 180/65.5 |

*Primary Examiner*—D. Glenn Dayoan
*Assistant Examiner*—Clovia Hamilton
*Attorney, Agent, or Firm*—Cohen, Pontani, Lieberman & Pavame

[57] ABSTRACT

A hybrid drive with an internal combustion engine and an electrical machine which has a rotor and a stator in a housing connected to the internal combustion engine. The engine and electrical machine are adaptively connected to one other by a clutch, preferably a friction clutch. The housing (21) includes a housing part (23) which supports the friction clutch (7) and the electrical machine (11), and includes a partition wall (29) which separates the electrical machine (11) from heat producers (31) such as the internal combustion engine (1) and the friction clutch (7). The insulating effect of the partition wall can be increased by the use of insulation (27) between the heat producers (31) and the electrical machine (11).

15 Claims, 7 Drawing Sheets

HYBRID DRIVE

BACKGROUND OF THE INVENTION

1. Field of the Invention

The present invention relates to a hybrid drive wherein the housing that supports the clutch and electrical component includes a partition wall for operating the electrical component from the internal combustion machine and clutch.

2. Description of Related Art

A conventional hybrid drive, for example, as disclosed in German Patent publication 43 23 601 A1, comprises an internal combustion engine and an electrical machine which may be connected to the engine by a friction clutch. The electrical machine and the friction clutch are arranged in a transmission case which is mounted to the engine housing. The friction clutch is arranged axially in the electrical machine which surrounds the clutch coaxially.

However, this construction is disadvantageous in that abraded segments of the friction clutch may enter the electrical machine, thereby dirtying the electrical machine. As a result of this dirtying, the efficiency of the electrical machine decreases and eventually results in a total breakdown of the electrical machine. Furthermore, the accumulation of dust causes heat to build-up in the machine resulting finally in the overheating of the electrical machine.

Another disadvantage of the conventional hybrid drive is that heat liberated upon the actuation of the friction clutch is transmitted to the heat-sensitive electrical machine. In addition, heat from the internal combustion engine is also transmitted to the electrical machine. The heating of the electrical machine has a negative effect on the efficiency and life of the machine. It may even lead to a breakdown of the electrical machine, for instance by a demagnetization of the permanent magnets arranged on the rotor, as a result of the relatively high temperature.

Another disadvantage is that because both the electrical machine and friction clutch are contained in the transmission case a larger amount of space is required, and in particular a greater axial length. A modified transmission case which provides the structural space required is needed. Thus, the use of a traditional transmission is not possible and so the price of the hybrid drive with a modified transmission is more expensive. This higher price of a modified transmission will be considerable since first of all small numbers are concerned.

SUMMARY OF THE INVENTION

The object of the present invention is to improve the housing of the electrical machine and friction clutch in such a manner that, on the one hand, the use of traditional transmissions and internal combustion engines is possible and that a more sensitive electrical machine is protected from influences which decrease its efficiency.

The housing has a housing part which supports the electrical machine and the friction clutch. In this way, a traditional transmission may be used in such a manner that the increased need for structural space resulting from the provision of the electrical machine as compared with a traditional drive line is provided by the housing part. This housing part is constructed to include a partition wall which separates the electrical machine from the heat producers such as the internal combustion engine and friction clutch. The heat-insulating effect of the separating partition wall may be increased by using insulation. There are various possibilities for providing insulation. In addition, the housing part may be constructed in such a manner so that air cushions are formed between the electrical machine and heat producers.

It is advantageous to provide a layer of heat-insulating material extending along the length of the partition wall. This insulation layer may be poured into the housing part in recesses intended for the insulating material. The housing part on the engine side may also be sprayed so that the side facing the internal combustion engine is at least partially covered by an insulating layer. In this embodiment, the insulating layer is part of the housing part. Alternatively, a groove may be provided in the housing part to receive an insulating layer which is pushed into the groove. In still another embodiment an insulating layer may be provided between the engine housing and housing part in such a way that the transfer of heat from the engine housing to the housing part is possible only by overcoming the insulating layer arranged therebetween. In each of these embodiments, the different types of insulating means may be provided in addition to, or in lieu of, other insulating measures. Furthermore, the insulating effect may be increased by reducing the contact surface. The contact surface area is reduced by specially constructing the housing part so that the smallest possible contact surface is provided between the housing part and engine housing. Providing a region of reduced cross section in order to reduce the possibility of heat transfer in a region of the housing between combustion engine and electrical motor also represents another type of insulation means.

Furthermore, cooling channels may be provided for transferring heat produced by the heat producers away from the housing part. The cooling channels are cast into the housing part and the connections for feeding and discharging the cooling liquid are connected directly to the housing part.

In another embodiment at least one hydraulic connection is provided which passes through the housing part and an actuating system associated with the friction clutch is controlled by the action of pressure via at least one hydraulic line connected to the hydraulic connection. Thus, hydraulic feed lines may be connected in a relatively simple manner to the outside of the housing part after the final assembly of the hybrid drive. For this purpose, the connections are preferably arranged that so they are readily accessible after final assembly.

A transmission shaft extends in an axial direction through the housing part. The transmission shaft has a bearing, and a bearing sleeve consisting of a material having a relatively small coefficient of expansion over a relatively large temperature range is provided to receive the bearing in the housing part. Steel, for example, represents a suitable material for the bearing sleeve. The expansion of a steel bearing sleeve in the event, for example, of a temperature difference of between approximately −40° C. to 100° C. is so slight that substantially optimal mounting of the shaft is assured throughout the entire temperature range.

On one side, the transmission side, the transmission shaft is received by the transmission case and on the other side, the drive side, it is mounted in a drive part such as the crankshaft. The transmission shaft is a multi-part shaft arrangement, preferably two-parts, comprising a transmission input shaft and shaft intermediate piece. The shaft intermediate piece extends along the extension of the transmission input shaft with the shaft intermediate piece serving as an adapter. The transmission case, after a substantially axial approach to the housing part is fastened to the latter. The drive-side free end of the transmission input shaft is introduced into a recess in the shaft intermediate piece with the recess acting as a radial bearing substantially fixed against rotation. The shaft intermediate piece has a free end mounted in the crankshaft. Using the shaft intermediate piece, the housing part which supports the electrical machine and the friction clutch is connected as a module on the one side to the internal combustion engine and on the other side to a traditional transmission, with the transmission input shaft being mounted on the drive side via the shaft intermediate piece.

The partition wall separating the electrical machine and friction clutch serves to substantially keep abraded particles out. The abraded particles of the friction clutch are substantially prevented from entering into the electrical machine since the machine is separated in space from the friction clutch by the partition wall. Thus, the electrical machine is protected against dirtying by abraded particles which would impair its efficiency. As a result, a relatively long life of the electrical machine is assured.

The hydraulic drive includes a hydraulic actuating system with a plurality of cylinders for actuation by means of pressure. Such an actuating system is known, for example, as disclosed in German Patent publication 44 14 684. This actuating system may be arranged coaxially around the transmission shaft and connected, by a hydraulic connection which is provided in the housing part, to the transmission shaft via a hydraulic line which controls the actuating system by the effect of pressure. In a space-saving arrangement, a recess may be provided in the housing part for receiving the actuating system, whereby the separating effect of the partition wall remains unaffected by the recess.

Furthermore, central disengagers may be used as the actuating system of the friction clutch. In a space-saving manner the central disengager may be arranged coaxially around the transmission shaft in a recess provided in the housing part. The central disengager may be a hydraulic central disengager and a mechanical central disengager, for example as disclosed in the publication "The mechanical central disengager for SAC—an alternative?", by Dr. Ad Kooy.

In order to precisely control the actuating system a displacement sensor associated with the actuating system may be provided. The sensor detects and monitors the position of the friction clutch and the actuating system is controlled as a function of the position of the friction clutch. In this regard, the position of the friction clutch may be determined in advance.

Furthermore, the coupling position is monitored by means of the sensor so that a decrease in pressure, due possibly to a leakage in the hydraulic system, may be immediately recognized.

An automatic shift transmission associated with the friction clutch is provided so that the target gear is known before the change of gear whereby the electrical machine may be controlled in such a manner that it actively supports synchronizing of the transmission. As a result of this active synchronization, a change in gear is effected relatively quickly. Furthermore, the friction clutch is actuated in a manner optimally adapted to the change in gear; in particular, the power flow is interrupted only for the time necessary for the change of gear. By the optimal adaptation of the friction clutch actuation, soft engagement is assured at all times.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
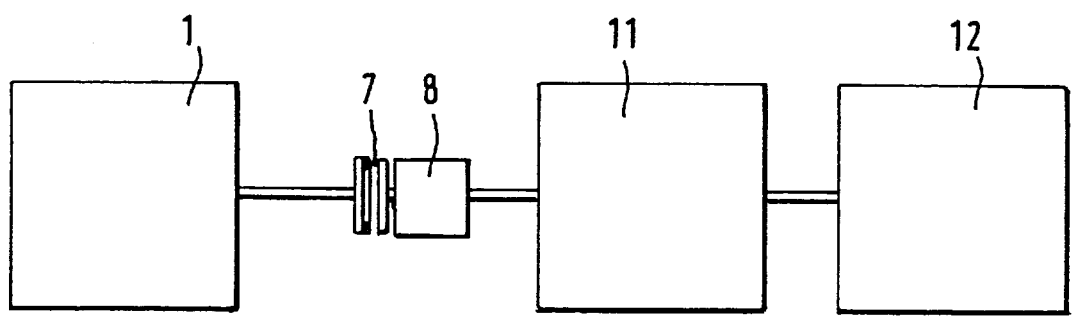
FIG. 1 diagrammatically depicts the arrangement of the drive line of the hybrid drive.

FIG. 1 shows the basic arrangement of a hybrid drive line. An internal combustion engine 1 is connected to an electrical machine 11 by a friction clutch 7 connected to an actuating system 8. The electrical machine 11 is in turn substantially rigidly connected to a transmission 12 by a transmission shaft 16. The section including the friction clutch 7, actuating system 8 and electrical machine 11 is shown in detail in FIGS. 2 through 4.

Figure 2:
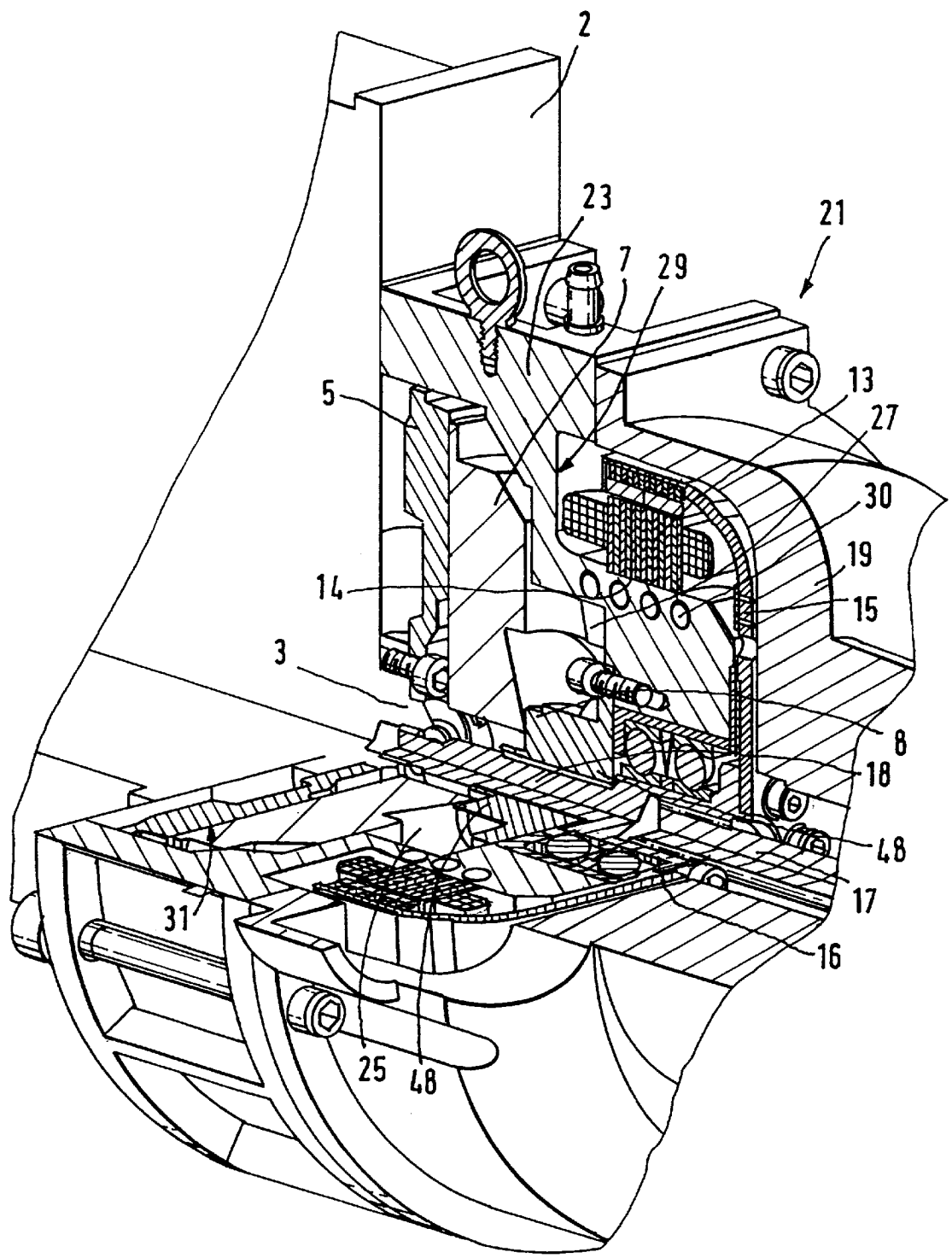
FIG. 2 shows a perspective view of the arrangement in the housing including the transmission case and housing part.

Referring to FIG. 2, a housing 21 is arranged between internal combustion engine 1 and transmission 12. Housing 21 has two parts 23, 19; the housing 21 is formed on the transmission side by a transmission case 19 and on the engine side by a housing part 23. The transmission case 19 at least partially encloses the electrical machine 11 which comprises a rotor 15 and a stator 13. Rotor 15 is fixedly connected for rotation to a transmission input shaft 17. The electrical machine 11 is an outside-rotor with the stator 13 arranged radially in the rotor 15. The stator 13 is connected on its radial inner side 14 to the housing part 23. Cooling channels 30 are provided in a region of the housing part 23 adjoining the stator 13. Housing part 23 is provided radially inwards with a bearing sleeve 41, preferably a steel bearing sleeve 43, which receives a bearing 45. Bearing 45 is provided for the transmission shaft 16 which passes axially through the housing part 23. Transmission shaft 16 comprises two parts, a transmission input shaft 17 and a shaft intermediate piece 18. Transmission input shaft 17 is fixedly connected in rotation by a connection 36 to the shaft intermediate piece 18. The transmission input shaft 17 is axially inserted into connection 36 which is preferably in the form of a toothing. Shaft intermediate piece 18 is rotatably mounted on the drive side in a crankshaft 3 of the internal combustion engine 1. An actuating system 8 is arranged coaxially around the shaft intermediate piece 18 and separated in space from the electrical machine 11 by a partition wall 29. This actuating system 8 acts on the friction clutch 7 which is arranged on the drive side in an axial direction. A flywheel 5 associated with the internal combustion engine 1 is arranged between friction clutch 7 and internal combustion engine 1.

The construction of the housing part 23 will now be described. By means of the housing part 23, the axial structural length of the drive line may be increased by an amount equal to a flange thickness 4. The housing part 23 on the transmission side has a partition wall 29 extending between friction clutch 7 and electrical machine 11 and supporting the stator 13 in the transmission case 19 up to the radially extending region of the rotor 15. In this regard, the housing part 23 is constructed in such a manner that air cushions 25 are formed between friction clutch 7 and partition wall 29.

Figure 3:
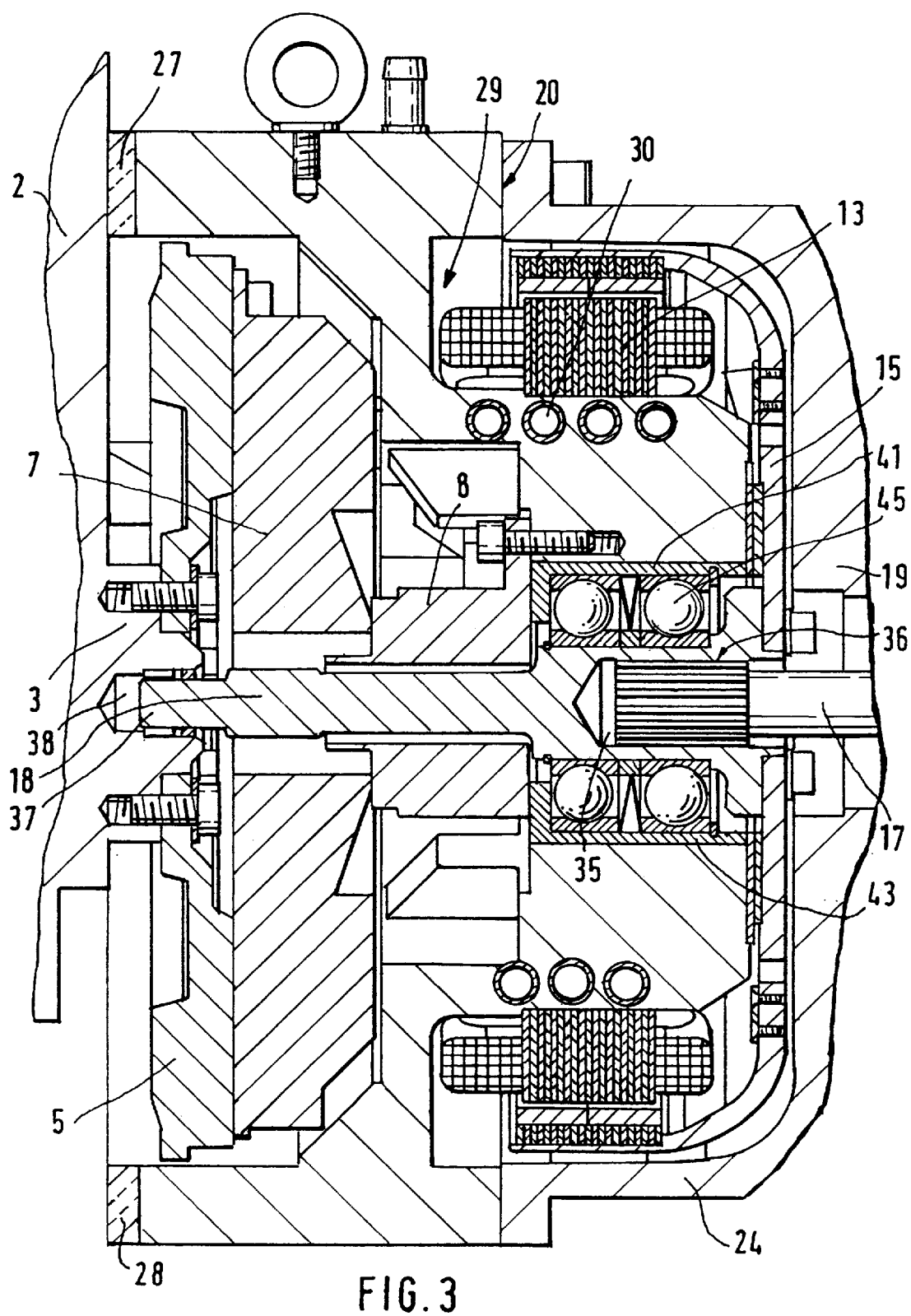
FIG. 3 is a cross-sectional view of the housing arrangement of FIG. 2.

In FIG. 3 an insulation layer 28 is arranged between internal combustion engine housing 2 and housing part 23 so that direct heat transfer from the engine housing 2 to the housing part 23 is reduced or substantially prevented.

Figure 4:
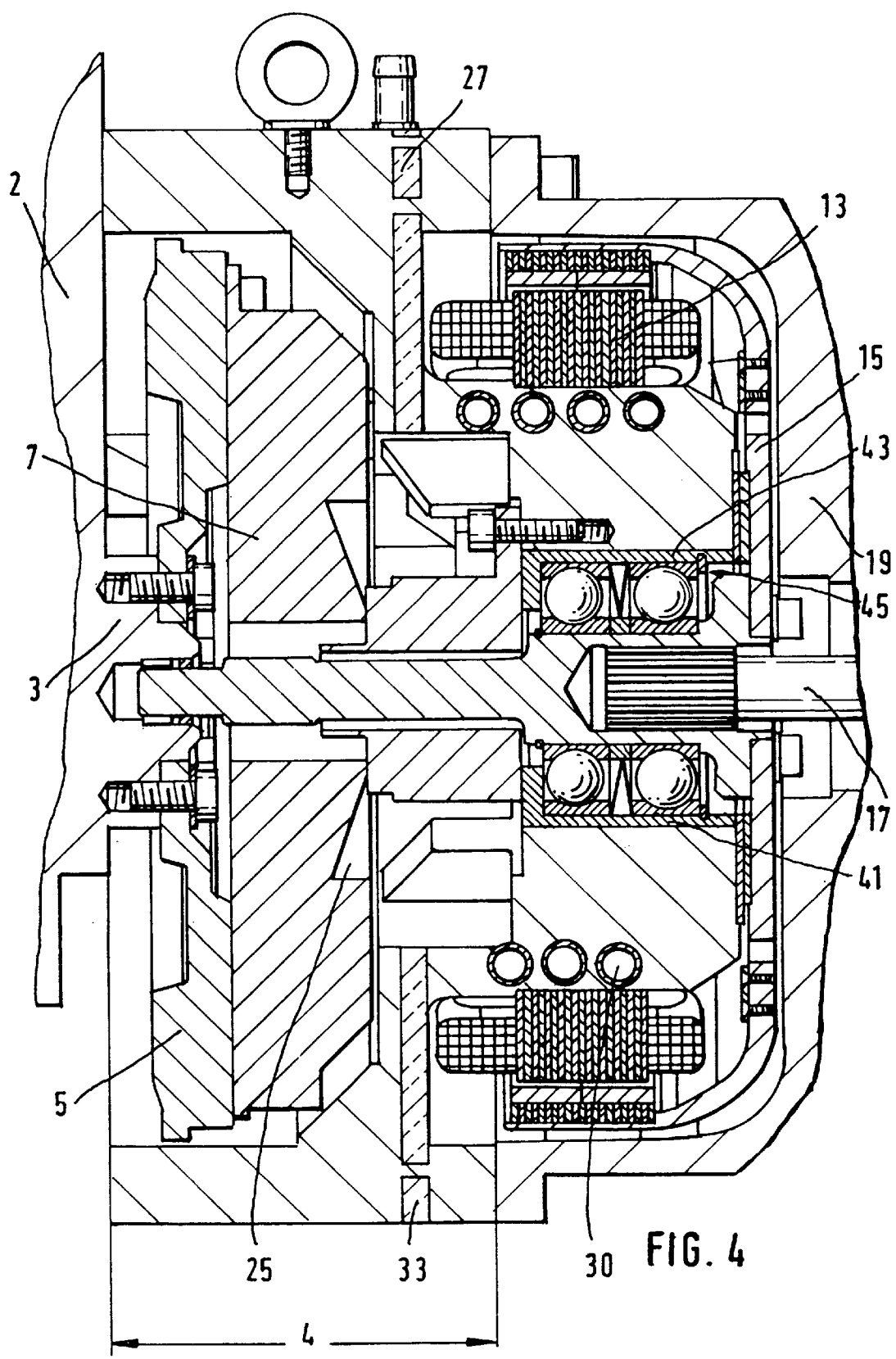
FIG. 4 shows the housing part including an insulation layer arranged in the region of the length of the partition wall.

In another embodiment shown in FIG. 4, the housing part 23 includes an insulation layer 33 forming part of the housing part arranged as shown or, alternatively, different arrangements are also contemplated.

Figure 5:
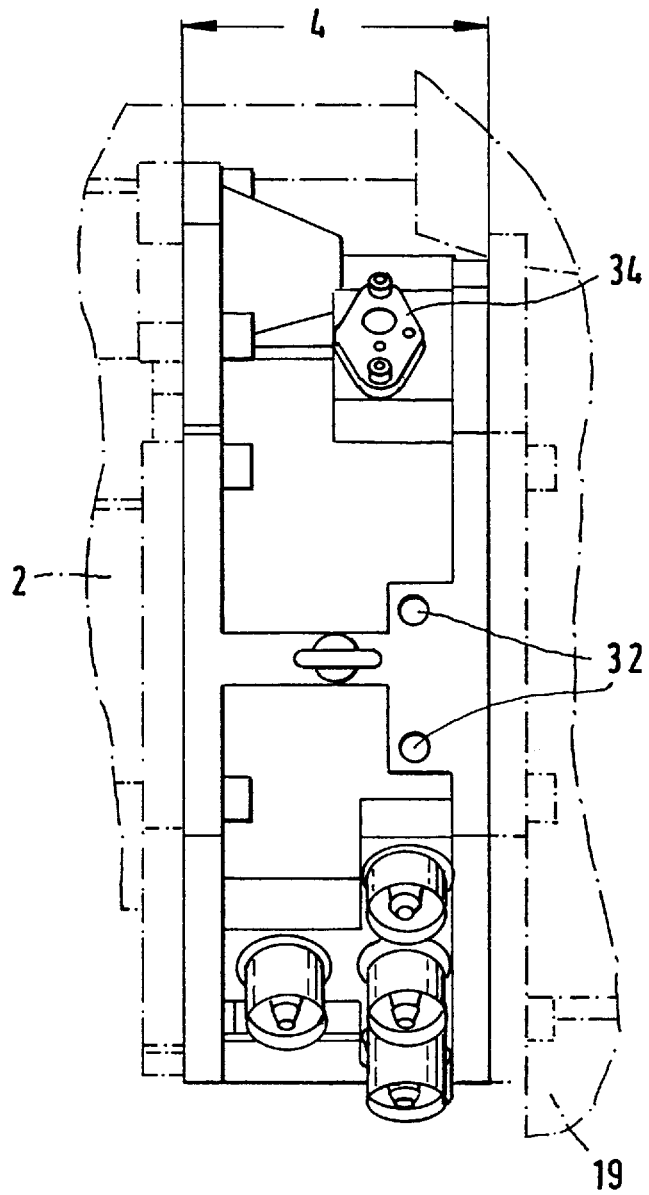
FIG. 5 is a top view of the housing part.
Figure 6:
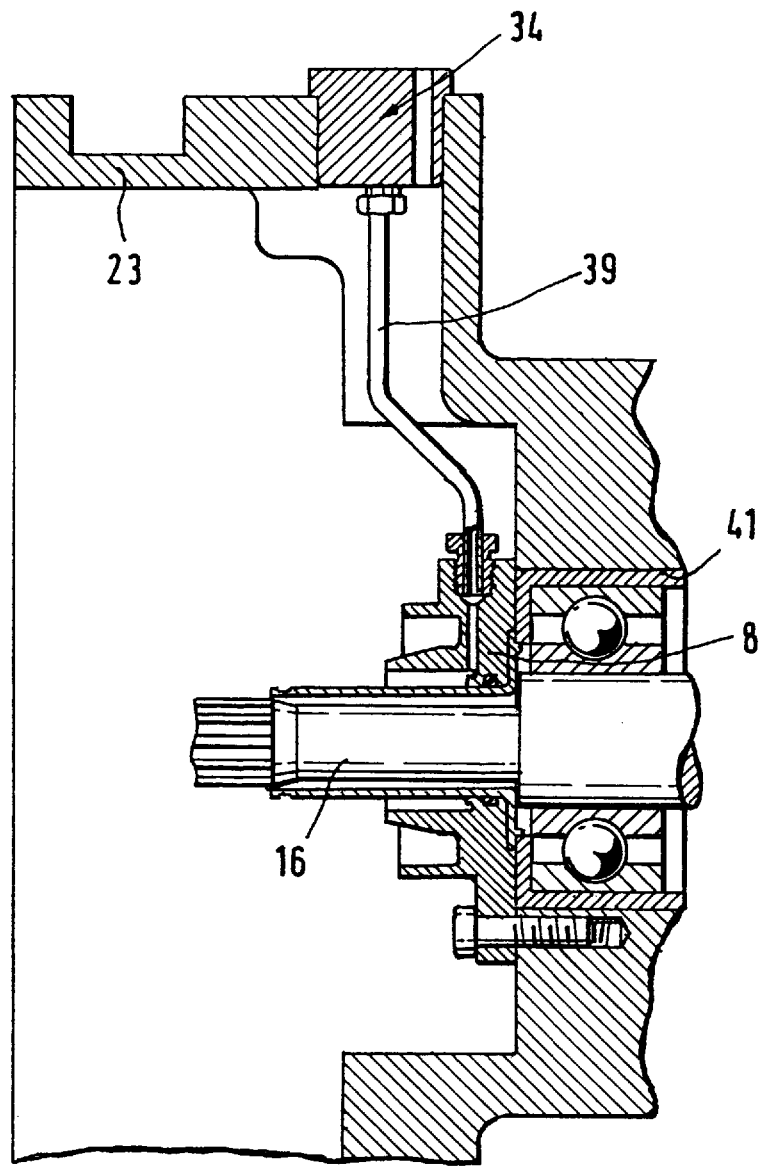
FIG. 6 shows the hydraulic connection with hydraulic line.

In the region of influence of the stator 13, cooling channels 30 extend in the housing part 23, the inlet and outlet 32 of which are arranged on the outside of the housing part, for example, in the arrangement shown in FIG. 5. A hydraulic connection 34 is provided for the actuating system 8 when using a hydraulic actuating system. A cross-sectional view of hydraulic connection 34 is shown in FIG. 6. A hydraulic line 39 connects hydraulic connection 34 to actuating system 8.

To assemble the drive line the clutch 7 is placed on the flywheel 5 of the internal combustion engine 1. The actuating system 8 and the stator 13 of the electrical machine 11 are connected to the housing part 23. The hydraulic line 39 associated with the actuating system 8 is connected to the hydraulic connection 34 provided in the housing part 23 and to the actuating system 8. The bearing 45 is introduced and the shaft intermediate piece 18 which penetrates axially through the housing part 23 is pushed in. The rotor 15 is firmly attached to the shaft intermediate piece 18. During final assembly, the engine housing 2 is connected to the housing part 23 which was mounted as previously described. In this connection the free end of the shaft intermediate piece 37 on the engine side is pushed, in the axial direction, into a recess 38 in the crankshaft 3 provided to receive the shaft intermediate piece 37. On the side facing away from the engine, the housing part 23 is connected to the transmission case 19, by pushing, in an axial direction, the transmission input shaft 7 into a recess 35 provided for it in the shaft intermediate piece 18 so as to be connected, substantially fixed for rotation, to it.

Figure 7:
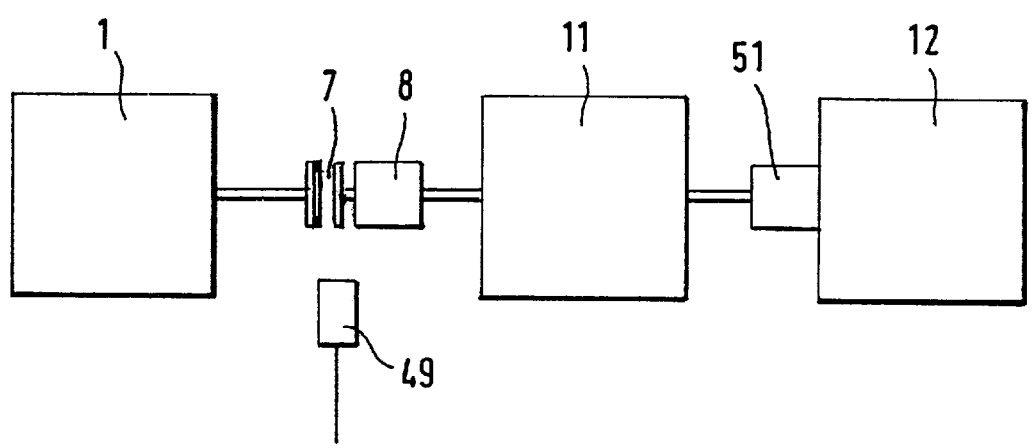
FIG. 7 diagrammatically depicts a hybrid drive line with automatic shift transmission.

FIG. 7 shows an expanded arrangement of the hybrid drive. This drive arrangement is expanded using a displacement sensor 49 which determines the position of the friction clutch 7 and an automatic shift transmission 51 which automatically enters the gears in the transmission 12. Tuned to the gear change, the actuating system 8 of the friction clutch 7 is therefore controlled based on the position of the friction clutch 7 detected by the sensor 49.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:
1. A hybrid drive comprising:
   an internal combustion engine;
   a housing connected to said internal combustion engine;
   an electrical machine in said housing, said electrical machine comprising:
      a rotor;
      a stator in said rotor;
   a clutch for adaptively connecting said internal combustion engine and said electrical machine; and
   insulating means interposed between said electrical machine and said internal combustion engine and clutch;
   wherein said housing comprises:
      a housing part supporting said clutch and said electrical machine, said housing part having a partition wall separating said electrical machine from said internal combustion engine and said clutch, wherein said partition wall accomodates said insulating means.

2. The hybrid drive in accordance with claim 1, wherein said housing part is constructed so that air cushions are defined between said electrical machine and said internal combustion engine and clutch.

3. The hybrid drive in accordance with claim 1, wherein said insulating means is a layer of heat insulating material in a region extending along the partition wall.

4. The hybrid drive in accordance with claim 1, wherein said internal combustion engine has a housing, said insulating means comprising a layer of heat insulating material disposed between said housing part and the housing of said internal combustion engine.

5. The hybrid drive in accordance with claim 1, wherein said housing part has cooling channels defined therein for transmitting heat produced by said internal combustion engine and clutch away from said housing part.

6. The hybrid drive in accordance with claim 1, further comprising:
   a hydraulic connection disposed in said housing part;
   an actuating system; and
   a hydraulic line connecting said hydraulic connection and said actuating system so as to control by pressure said actuating system.

7. The hybrid drive in accordance with claim 6, wherein said actuating system is associated with said clutch.

8. The hybrid drive in accordance with claim 1, further comprising:
   a transmission shaft extending axially through said housing part;
   a bearing supporting said transmission shaft; and
   a bearing sleeve for receiving said bearing.

9. The hybrid drive in accordance with claim 1, further comprising:
- a crankshaft disposed in said internal combustion engine and having a recess defined therein;
- a transmission shaft extending axially through said housing part and mounted in said crankshaft, said transmission shaft comprising:
  - a transmission input shaft having a proximal end; and
  - a shaft intermediate piece having a proximal end disposed in the recess of said crankshaft and a recess defined in an opposite distal end facing away from said internal combustion engine for receiving the proximal end of said transmission input shaft so as to be substantially fixed in rotation.

10. The hybrid drive in accordance with claim 1, wherein said housing comprises a transmission case surrounding said internal combustion engine and clutch and wherein the partition wall disposed between said electrical machine and said clutch is constructed so as to substantially prevent abraded particles from entering said electrical machine.

11. The hybrid drive in accordance with claim 10, further comprising a hydraulic actuating system for engaging and disengaging said clutch by pressure generated by a plurality of cylinders.

12. The hybrid drive in accordance with claim 10, further comprising an actuating system for engaging and disengaging said clutch, said actuating system including a central disengager.

13. The hydraulic drive in accordance with claim 11, further comprising a displacement sensor associated with said actuating system for determining a position of said clutch.

14. The hydraulic drive in accordance with claim 12, further comprising a displacement sensor associated with said actuating system for determining a position of said clutch.

15. The hybrid drive in accordance with claim 13, further comprising an automatic shift transmission associated with said clutch providing a target gear before changing gear so that said electrical machine is controlled to maintain synchronization of transmission and said clutch is optimally actuated to the changing gear.

* * * * *